United States Patent [19]

Richards

[11] Patent Number: 4,504,186

[45] Date of Patent: Mar. 12, 1985

[54] TURRET STACKER

[75] Inventor: Lawrence J. Richards, Elk Grove Village, Ill.

[73] Assignee: Braner Enterprises, Schiller Park, Ill.

[21] Appl. No.: 565,475

[22] Filed: Dec. 27, 1983

Related U.S. Application Data

[63] Continuation of Ser. No. 422,721, Sep. 24, 1982, abandoned, and a continuation-in-part of Ser. No. 288,479, Jul. 30, 1981, abandoned.

[51] Int. Cl.³ ............................................. B65G 57/03
[52] U.S. Cl. .................................. 414/744 A; 414/71; 414/736; 414/911; 414/47; 901/17; 198/486
[58] Field of Search ............... 414/47, 69, 618, 744 R, 414/744 A, 744 B, 744 C, 70, 71, 590, 911, 736; 901/17; 198/486

[56] References Cited

U.S. PATENT DOCUMENTS

| 2,833,434 | 5/1958 | Stover et al. | 414/744 B X |
| 3,128,118 | 4/1964 | Ezzell | 414/618 X |
| 3,760,956 | 9/1973 | Burch | 414/744 A |
| 3,861,536 | 1/1975 | Braner et al. | 414/52 |
| 4,281,959 | 8/1981 | Minnetti | 414/590 X |
| 4,293,272 | 10/1981 | Jellema | 414/744 B |
| 4,303,166 | 12/1981 | Campbell et al. | 414/744 R X |

FOREIGN PATENT DOCUMENTS 1564912  4/1980  United Kingdom ............. 414/911

Primary Examiner—Joseph E. Valenza
Assistant Examiner—Ken Muncy
Attorney, Agent, or Firm—Lee, Smith & Zickert

[57] ABSTRACT

A transporting device for lifting and relocating material from one position to another. In one embodiment, the transporting device comprises a stationary central support pedestal and a rotatable turret situated at the top of the pedestal. The turret has at least a pair of arms which extend radially outwardly from the pedestal. Each arm has an adjustable lifting and stacking mechanism for gripping and transporting of material as the turret is rotated. In another embodiment, the transporting device comprises a rotatable central support turret situated on a stationary pedestal. A pair of arms extend radially outwardly from the turret. Each arm may be raised and lowered independently of the other and includes a mechanism for gripping material as the turret is rotated. In either embodiment, the turret is driven by a motor situated in the stationary pedestal.

6 Claims, 9 Drawing Figures

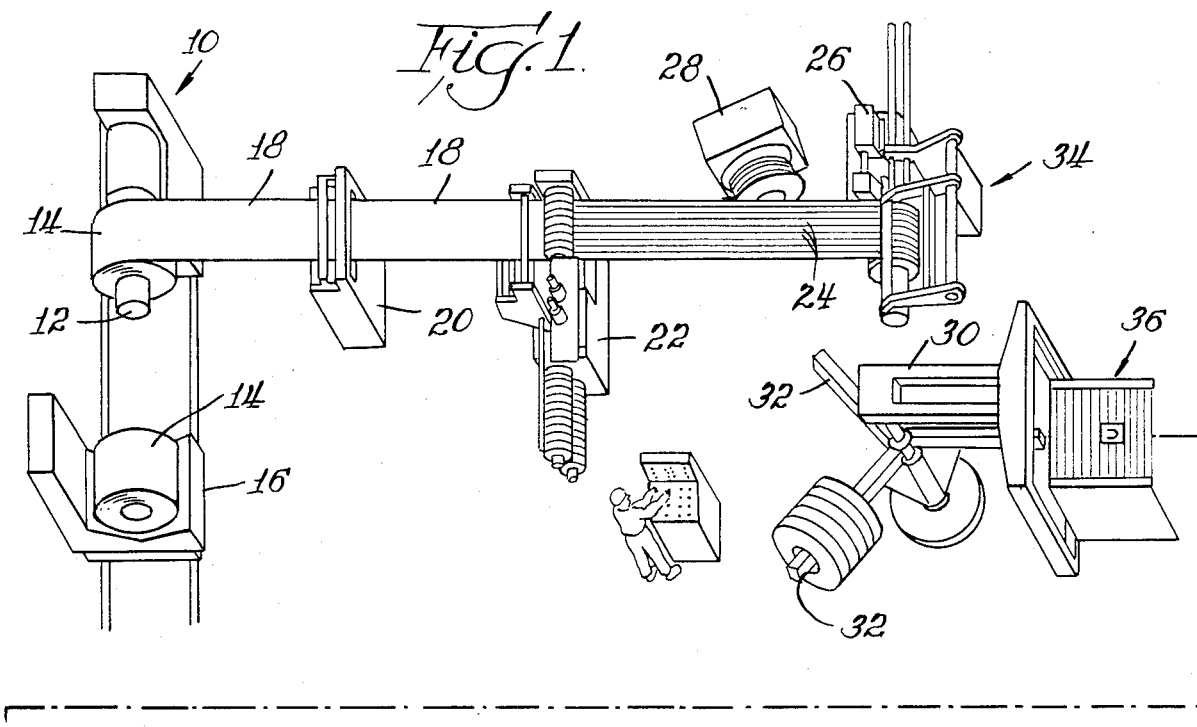
Fig. 1
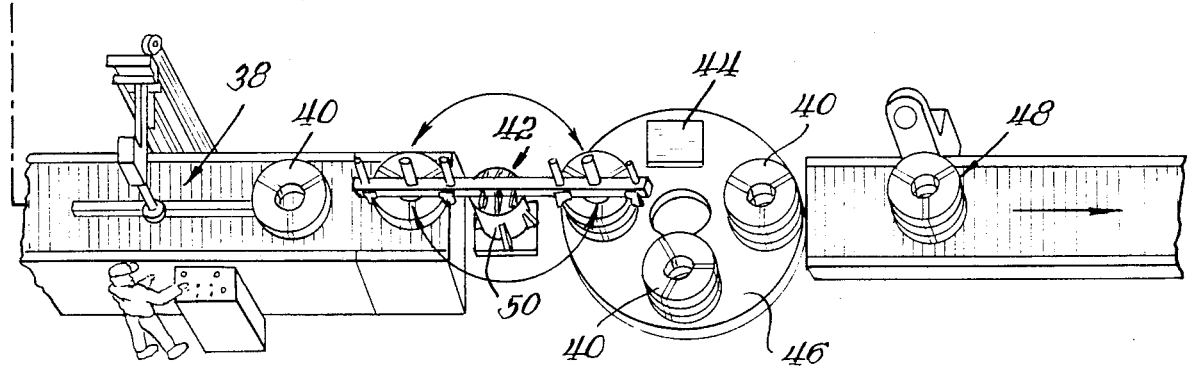
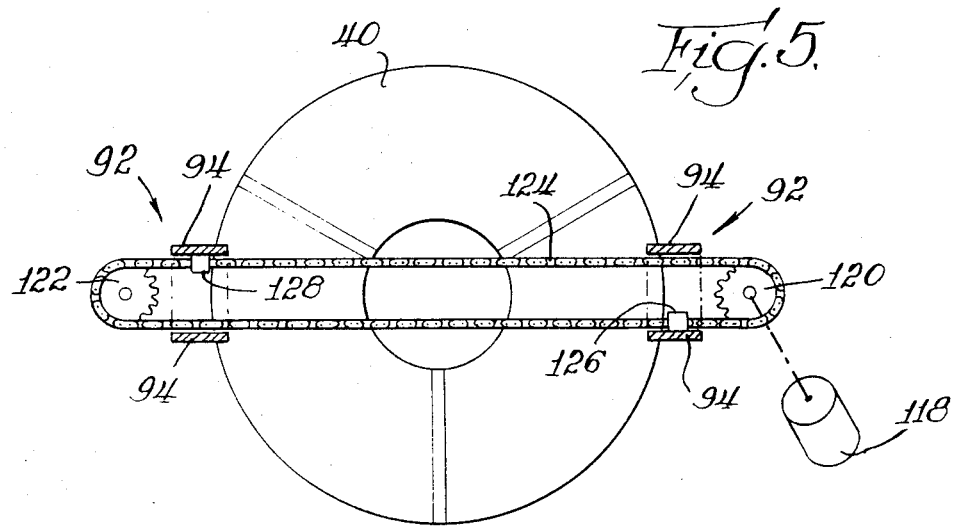
Fig. 5

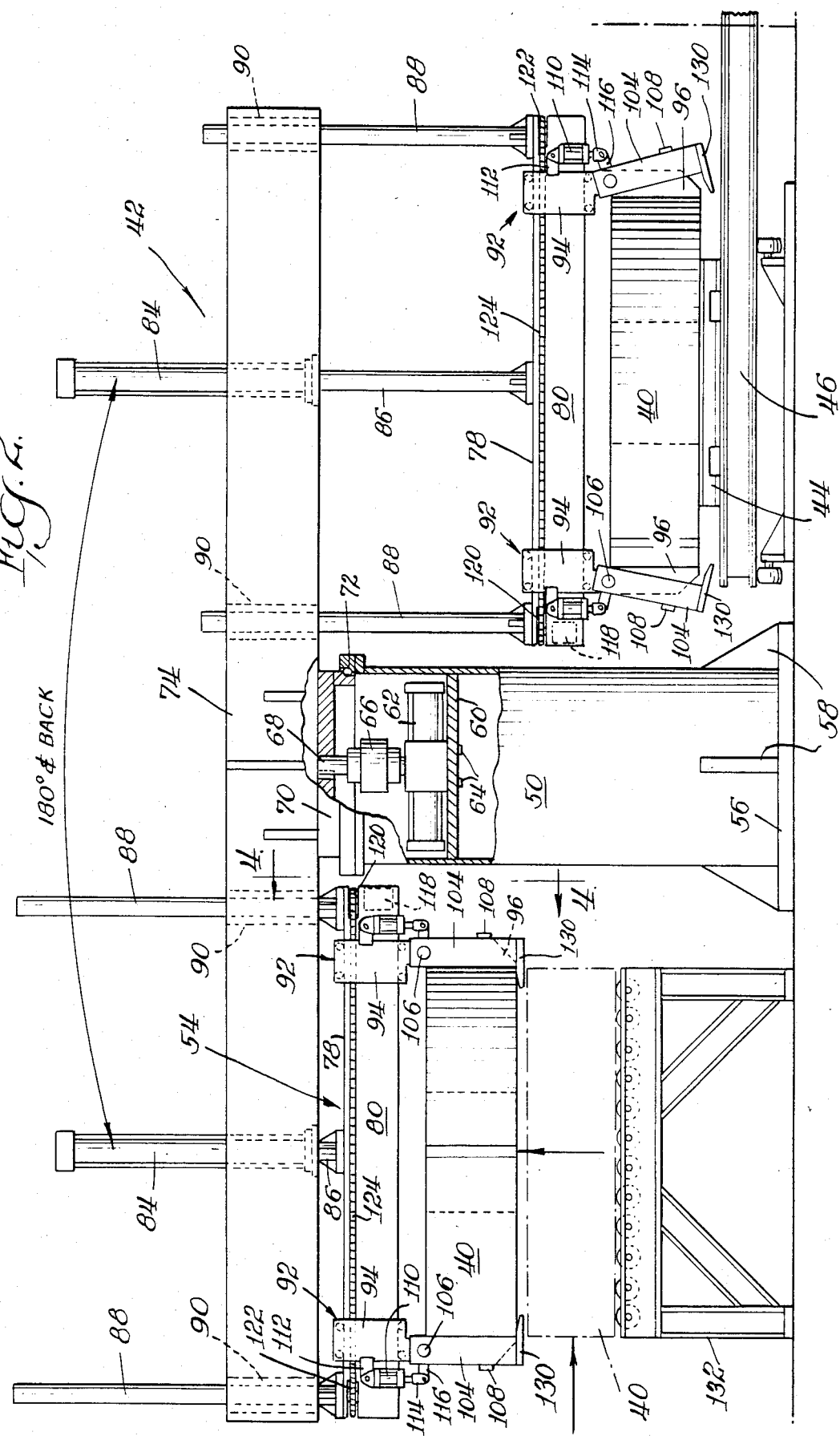

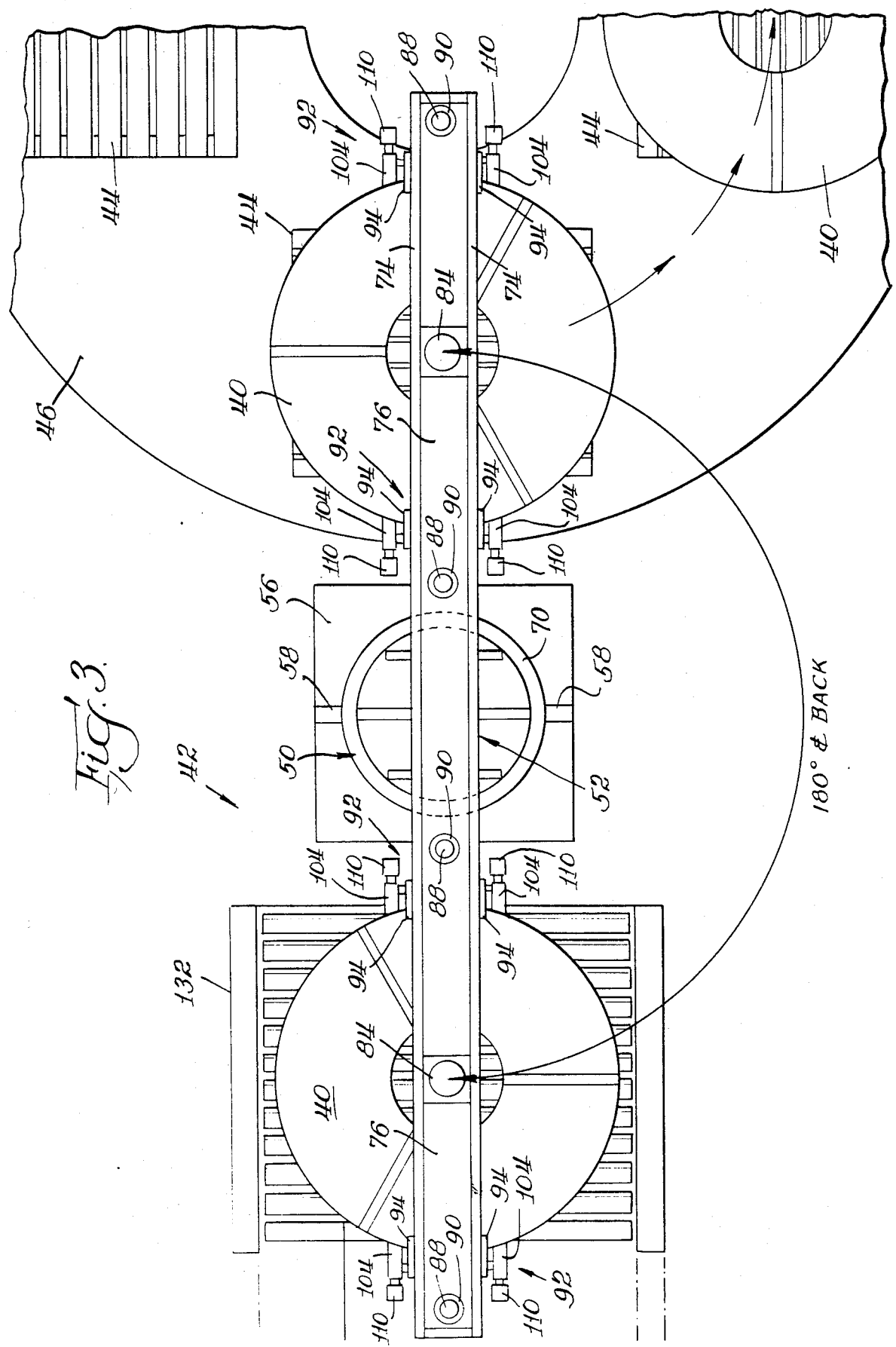

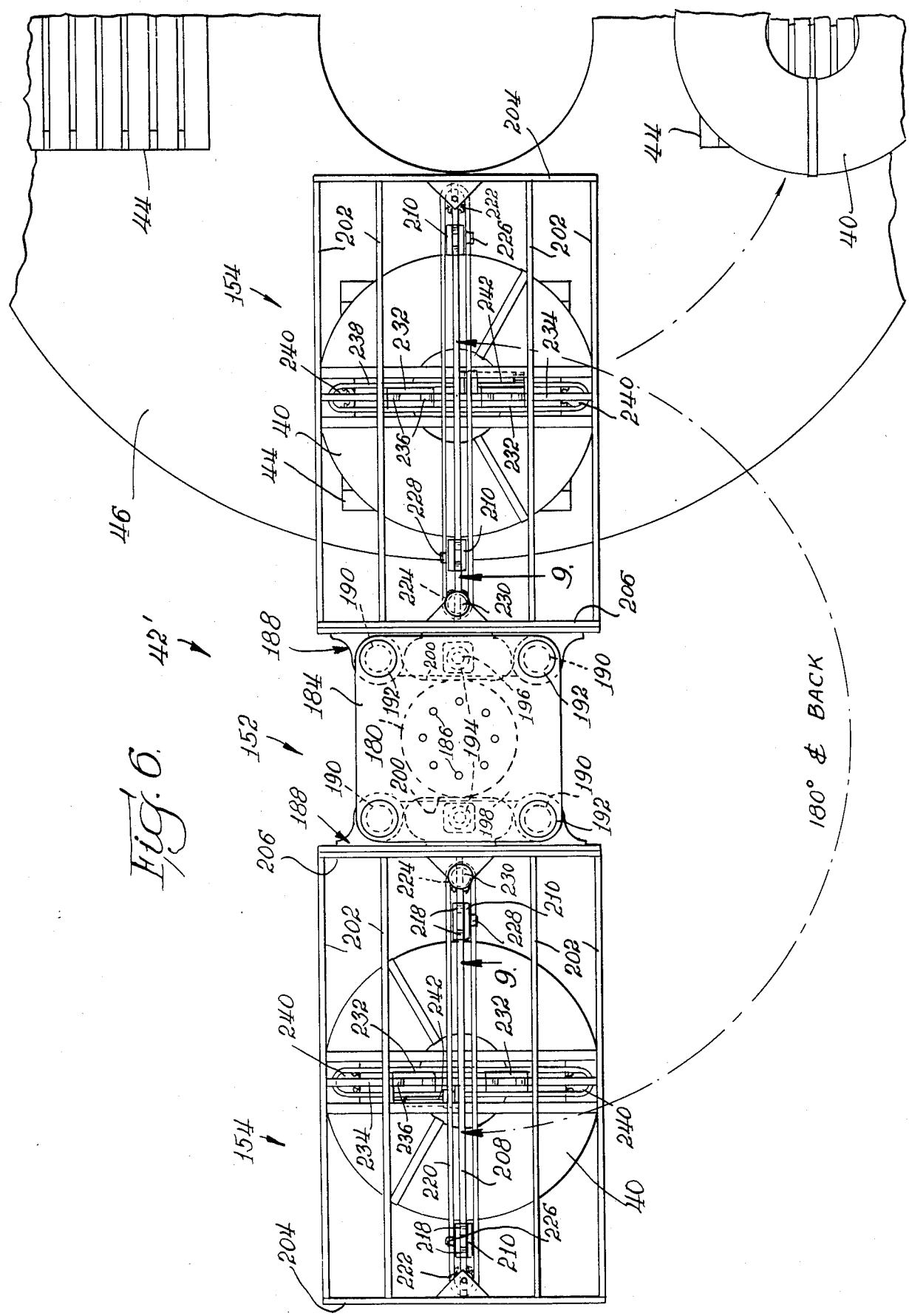

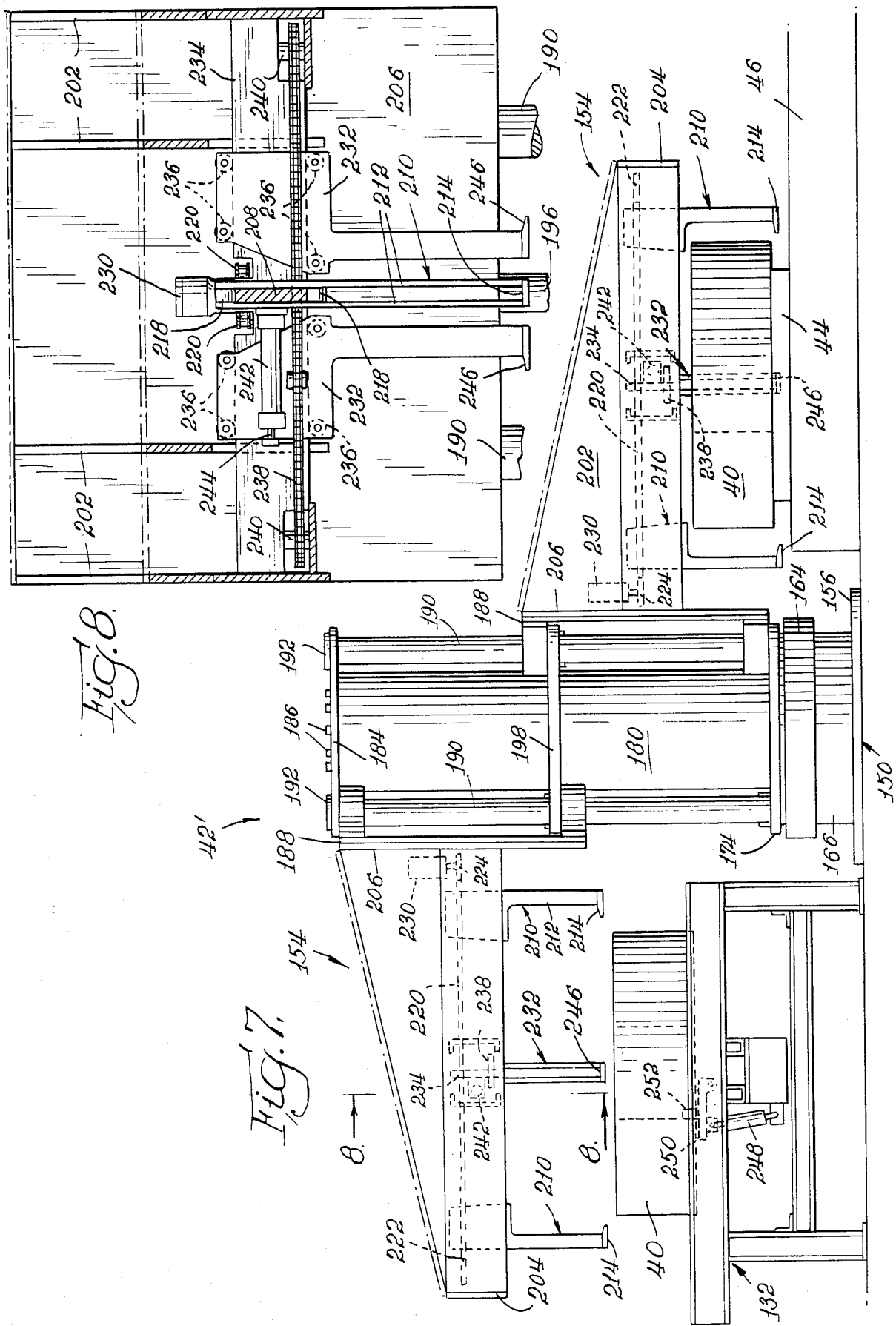

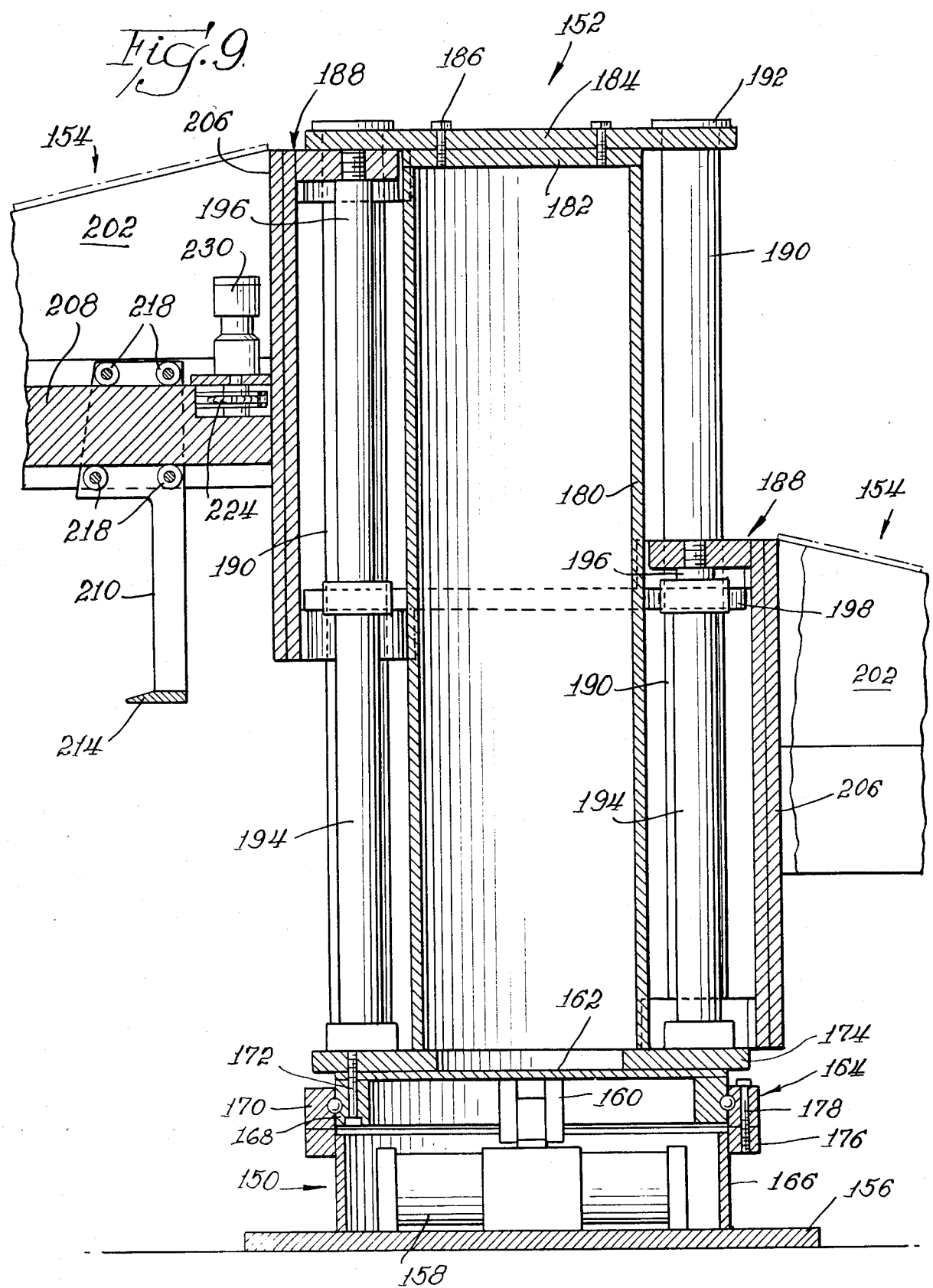

TURRET STACKER

RELATED APPLICATION

This application is a continuation of my copending application Ser. No. 422,721 now abandoned, filed Sept. 24, 1982, entitled "Turret Stacker", which in turn is a continuation-in-part of my application Ser. No. 288,479 now abandoned, filed July 30, 1981, entitled "Turret Stacker".

BACKGROUND OF THE INVENTION

This invention relates to material transporting devices, and in particular to a device for relocating stacks of material from one position to a second position. In the disclosed embodiments, the invention pertains to equipment for handling coils of slit metallic sheet material.

In the coil slitting and processing industry, and as set forth in somewhat greater detail in the following description of the preferred embodiments of the invention, large rolls of sheet material are unrolled, then passed through a slitter which longitudinally cuts the sheet material into a plurality of thinner strips of metal, which are then recoiled, and then handled downstream as required, normally by stacking, palletizing and weighing.

U.S. Pat. No. 3,861,536, assigned to the assignee of the present invention, describes one type of device for transporting coils of material and stacking the coils onto a turntable, the stacked coils being later removed from the turntable at one or more locations. The transporting device of this patent, while representing a significant advance over stacking equipment then in existence, itself can prove to be a bottleneck in a complete line for slitting and processing metal coil since the stacker must reciprocate between an inlet conveyor and the turntable directly beneath the stacker. Thus, while material is being lowered to the turntable, upstream coils are prevented from entering the stacker until the stacker returns to a position to accept the next coil or several coils of material.

SUMMARY OF THE INVENTION

The transporting device according to the invention eliminates the above-delineated deficiencies of the prior art and others by providing an apparatus which, at one side, can accept incoming coils of material while, at the same time, the other side can independently place previously retrieved cils onto a turntable or other conveying equipment. Thus, the invention is able to perform two functions simultaneously which, in accordance with the prior art, could be accomplished only in serial fashion.

In accordance with the invention, a transporting device is provided comprising a stationary central support pedestal and a rotatable turret situated at the top of the pedestal. The turret includes at least two arms, each of which extends radially outwardly from the pedestal. A lifting and stacking mechanism is located beneath each arm. The turret is rotated by driving means situated in the pedestal and attached to the turret.

The lifting and stacking mechanism includes a support for the coiled material, means to raise and lower the material support, and means to enlarge and contract the material support to accommodate coils of varying diameters. In accordance with a first embodiment, the material support comprises a beam beneath each arm and a pair of carriages movable along the beam in opposite directions, each of the carriages including rests for holding material to be relocated by the transporting device.

In order to raise and lower the beam, a double acting cylinder is connected between each beam and its associated arm. A pair of upstanding guides is attached to opposite ends of the top of the beam and extend through corresponding guideways formed in the arm in order to guide the beam as it is raised and lowered.

In the first embodiment the invention includes a motor mounted on the beam to enlarge and contract the material support. The motor is drivingly attached to the carriages by an endless chain passing over sprockets at opposite ends of the beam, one side of the chain being attached to one of the carriages and the other side of the chain being attached to the other of the carriages such that rotation of the chain in one direction drives the carriages toward one another and rotation of the chain in the opposite direction drives the carriages away from one another.

Each of the rests attached to each carriage comprises a leg pivotally affixed to the carriage. A double acting cylinder is connected between the carriage and the leg for pivoting of the leg toward and away from material to be transported. With the legs pivoted away from the material, the material support can be raised and the turret rotated, leaving the material at a desired location for further handling.

While the rotatable turret may include more than two arms, in the preferred embodiments of the invention, the turret comprises two arms. In the first embodiment, the arms are oppositely situated, comprising opposite halves of an elongated frame. One arm is therefore situated to receive a coil of material, while the other is situated to simultaneously place a previously-received coil of material onto a downstream turntable for further handling and transportation. If desired, the rotatable turret can comprise any number of such arms in order to handle a greater number of coils of material at any one time.

In a second embodiment of the invention, the material support comprises a frame portion of each arm and a first pair of carriages located beneath the frame portion and movable in opposite directions, the carriages including rests for holding material to be relocated. A second pair of carriages is located beneath the frame and the carriages are movable in opposite directions, with the second pair of carriages including rests for holding material to be relocated and being situated transverse to the first pair of carriages. Preferably, the rests of the first and second pair of carriages are situated such that the first pair of carriages engages the exterior diameter of a coil, while the second pair of carriages engages the coil from its inner diameter.

In the second embodiment in order to enlarge and contract the two pairs of carriages, the first pair of carriages is driven in precisely the same manner as the carriages in the first embodiment of the invention. The second pair of carriages includes an actuating means in a form of a cylinder attached to the frame of the arm and one of the second pair of carriages. The carriages are interconnected by means of a chain and sprocket arrangement such that extension of the cylinder increases the spacing between the second pair of carriages and contraction of the cylinder decreases the spacing between the second pair of carriages.

In the second embodiment the arms are mounted for raising and lowering in order to raise and lower the material support. The means for raising and lowering the arms comprises a double-acting cylinder connected between each arm and the rotatable turret. A guide for raising and lowering of each arm comprises a pair of vertical rods affixed to the turret and a bracket assembly to which each arm is attached. The bracket assembly is mounted on the rods for vertical movement thereon, thus permitting the vertical movement of each arm as it is driven by its associated doubleacting cylinder.

BRIEF DESCRIPTION OF THE DRAWINGS

The invention is set forth in greater detail in the following description of the preferred embodiments, taken in conjunction with the drawings, in which:

FIG. 1 is a schematic representation of a typical coil slitting, processing and packaging line including the transporting device according to the invention, FIG. 2 is an enlarged side elevational illustration, with portions in cross section, illustrating a first embodiment of the transporting device according to the invention, FIG. 3 is a top plan illustration of the coil transporting device of FIG. 2, FIG. 5 is a top schematic illustration of the means for enlarging and contracting the material support, FIG. 6 is a top schematic illustration, with portions removed for clarity, of a second embodiment of the invention, FIG. 7 is a side elevational illustration of the second embodiment of the invention, FIG. 8 is an enlarged cross-sectional illustration taken along lines 8—8 of FIG. 7, and FIG. 9 is an enlarged cross-sectional illustration taken along lines 9—9 of FIG. 6.

DESCRIPTION OF THE PREFERRED EMBODIMENTS

Figure 4:
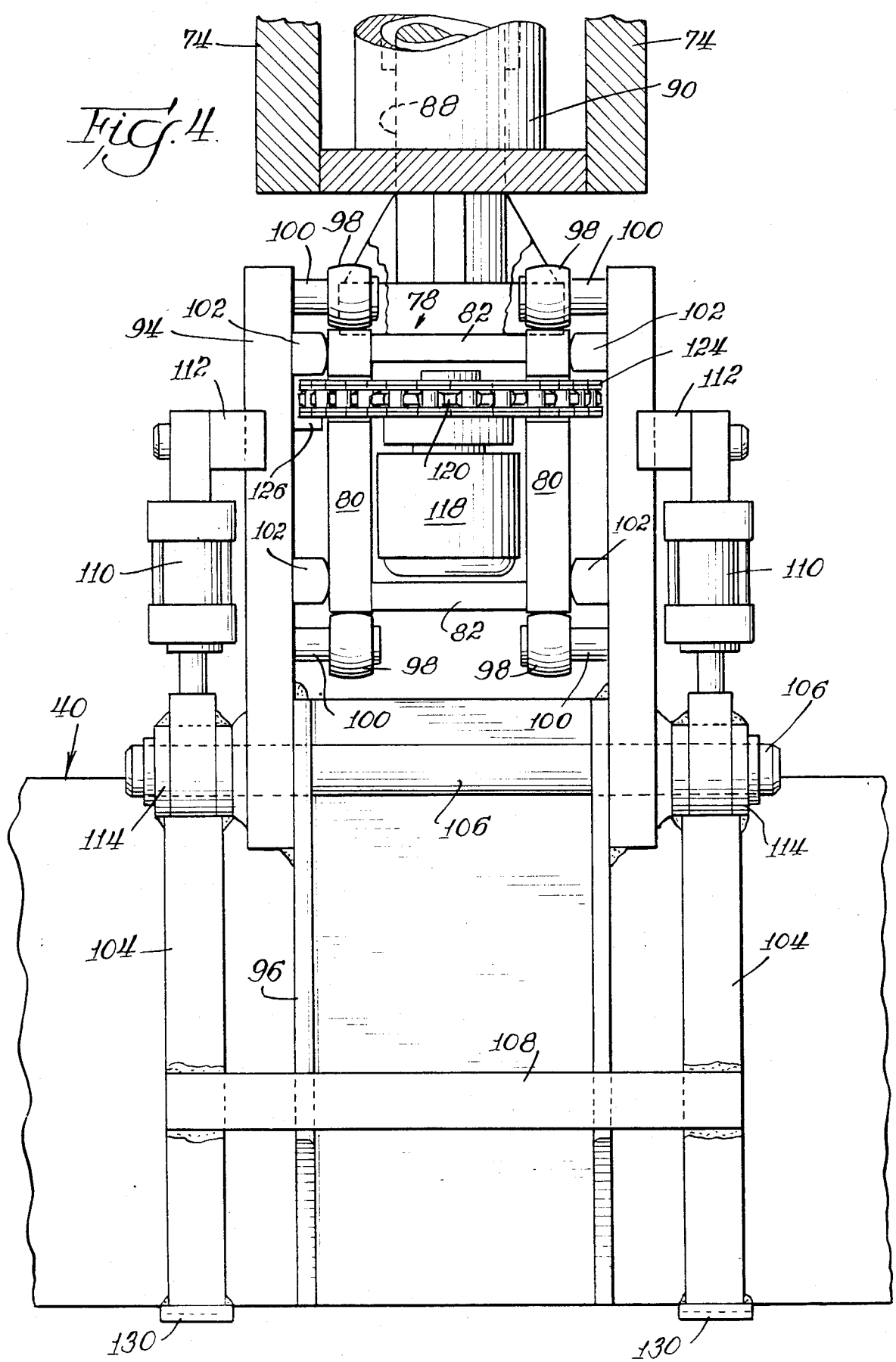
FIG. 4 is an enlarged end illustration of the coil lifting and stacking mechanism.

One embodiment of the invention is illustrated in FIGS. 1 through 5. Turning first to FIG. 1, a typical line for coil slitting, processing and packaging is depicted. Of course, depending on the particular requirements of the user, other or fewer equipment components might be employed in the line of equipment.

The line begins with an uncoiler 10 having a mandrel 12 upon which coils 14 of sheet metal are mounted for downstream processing. A coil car 16, carrying another coil 14, is employed to reduce line downtime as one coil 14 is exhausted and another situated in its place upon the mandrel 12.

Sheet metal 18 is withdrawn from the coil 14 within the uncoiler 10 and passed through a crop shear 20. The shear 20 is activated periodically to sever the metal sheet 18 into predetermined lengths.

From the crop shear 20, the sheet 18 passes through a slitter 22, such as the turret-type slitter described in U.S. Pat. No. 3,727,503, assigned to the assignee of the present invention. In the slitter 22, the metal sheet 18 is slit into a plurality of ribbons of metal 24 of desired widths. The metal ribbons 24 are then rewound into individual coils in a recoiler 26.

Often, although the great majority of the sheet 18 is slit in the slitter 22, a small marginal edge portion is not desired and it is, therefore, directed to a scrap winder 28 where it is collected and later removed for disposal.

Coils are removed from the recoiler 26 onto a transfer horn 30. The transfer horn 30 includes one or more lateral arms 32 which, when aligned with the recoiler 26, permit an overarm separator 34 to remove one or more coils from the recoiler 26 onto the arm 32. Coils on the arms 32 of the transfer horn 30 are removed by a downender 36 which receives individual coils from the transfer horn 30 in their vertical orientation and reclines the coils to a horizontal orientation.

From the downender 36, individual coils are conveyed to a banding machine 38. The individual coils are banded with metal strapping or the like in the banding machine 38 and the banded coils, one of which is shown at 40 in FIG. 1, are then conveyed to a transporting device 42 according to the invention.

In the transporting device 42, individual coils are removed from the upstream conveyor and are placed upon skids 44 situated on a turntable 46. As many coils as desired are stacked on each skid 44 by the transporting device 42 and then the turntable 46 is indexed a desired amount (90 degrees in the turntable 46 illustrated), in order to place a succeeding skid 44 beneath the transporting device 42.

From the turntable 46, the stacks of coils 40 pass on to a scale conveyor 48 where the individual coil stacks are weighed. Finally, the coil stacks pass on downstream for banding, shipping, or other handling as required.

FIGS. 2 through 5 illustrate the transporting device 42 in greater detail. The transporting device 42 includes, as primary components, a stationary central support pedestal 50, a rotatable turret 52 situated at the top of the pedestal 50 and a pair of lifting and stacking mechanisms 54 extending from each arm of the turret 52.

The pedestal 50 has an integral base 56 which sits upon a factory floor or some other substantial location. Gussets 58 may be employed to strengthen the junction between the pedestal 50 and base 56 and assure rigid placement of the pedestal 50.

The pedestal 50 includes a horizontal plate 60 attached near the top, such as by welding, bolting, or other appropriate means. A driving means is attached to the plate 60 and the turret 52 for rotation of the turret. In the embodiment illustrated, the driving means comprises a rotary hydraulic actuator 62 attached by bolts 64 to the plate 60. A coupling 66 joins the output shaft of the actuator 62 to a shaft 68 affixed to a plate 70 securely attached to the turret 52. A ring bearing 72 is situated between the plate 70 and the top of the pedestal 50 to support the turret 52 and permit rotation of the turret by the hydraulic actuator 62.

The actuator 62, which is conventional, is designed to rotate its output shaft in predetermined increments, such as 180°. Reverse activation of the actuator 62 causes return rotation. Thus, in the embodiment of the invention illustrated in the drawings, when the actuator 62 is activated, the turret 52 is therefore rotated 180°. Reverse activation of the actuator 60 causes the turret 52 to rotate 180° in the opposite direction. Of course, if desired, the actuator 62 can be replaced by a motor or other driving means which can rotate the turret 52 in desired increments in one direction rather than the two-directional rotation of the actuator 62.

The rotatable turret 52 is comprised of a pair of vertically oriented support members 74 which are joined by a pair of horizontally oriented support members 76. The support members 74 and 76 preferably are made of metal and are joined at their abutting locations by welding or other appropriate means to form a box beam. The metal thickness of the support members 74 and 76 depends on the material to be supported and handled by the lifting and stacking mechanism 54.

As best illustrated in FIGS. 2 and 3, the turret 52 is symmetrically situated upon the support pedestal 50, each half of the turret 52 therefore comprising an arm which extends radially outwardly from the pedestal 50. Each of the arms is the sole support for each of the lifting and stacking mechanisms 54. Of course, depending upon the requirements of the transporting device 42, the rotatable turret 52 can be composed of more than two arms, the number of arms being determined by the requirements of the transporting device 42. Normally, however, since materials of great weight are handled by the transporting device 42, the arms of the rotatable turret 52 are symmetrically situated to provide the best possible weight distribution.

Each of the lifting and stacking mechanisms 54 is composed of a beam 78 beneath the rotatable turret 52. Similar to the structure of the rotatable turret 52, and as best illustrated in FIG. 4, the beam 78 comprises a pair of vertical support members 80 separated by a pair of horizontal support members 82.

The beam 78 is supported beneath the turret 52 by a double acting cylinder 84. The shaft 86 of the cylinder 84 is attached to the top horizontal support member 82 of the beam 78. The housing of the cylinder 84 is firmly mounted to and through the two horizontal support members 76 of the turret 52.

A pair of guides 88 are attached to opposite ends of the top horizontal support member 82 of the beam 78. The guides 88 pass through guideways 90 situated in the rotatable turret 52 between the spaced horizontal support members 76. Thus, as the cylinder 84 is actuated to raise and lower the beam 78 (actuating means not illustrated), the guides 88 assure that the beam 78 is firmly aligned directly beneath the rotatable turret 52.

The lifting and stacking mechanism 54 also includes a pair of carriages 92 mounted on the beam 78. As shows in greatest detail in FIG. 4, each of the carriages 92 is composed of a pair of vertical plates 94, the spacing of which is maintained by a separator 96. Each of the vertical plates 94 includes wheels 98 which are rotatably mounted upon shafts 100 and which bear on opposite edges of the vertical support members 80. Shoes 102, attached to the plates 94 and butting against the vertical support members 80, maintain the proper orientation of the carriage 92 on the beam 78.

Each of the carriages 92 includes a pair of downwardly depending legs 104. Legs 104 are pivotally mounted on a central axle 106 which passes through and is firmly attached to the base of the vertical plates 94. Spacing of the legs 104 is maintained by a brace 108.

A double acting cylinder 110 is mounted between each of the vertical plates 94 and legs 104 in order to permit pivoting of the legs 104 toward and away from the coils 40 (FIG. 1). Means for actuating the cylinders 110 is not illustrated, but is conventional. As best shown in FIG. 4, one end of each of the cylinders 110 is pivotally attached to a bracket 112 affixed to a vertical plate 94. The opposite end of the cylinder 110 is attached to a U-shaped bracket 114 which, in turn, is pivotally attached to a bar 116 affixed to the leg 104. Thus, actuation of the cylinders 110 will cause the legs 104 to pivot about the axles 106.

The two carriages 92 on each beam 78 are driven toward and away from each other in order to accommodate coils 40 of varying diameters. A motor 118 is located within the beam 78, at one end thereof, and is drivingly attached to a sprocket 120. A similar sprocket 122 is located at the opposite end of the beam 78. An endless chain 124 passes over the sprockets 120 and 122. The chain is attached to one of the vertical plates 94 in each of the carriages 92 on opposite sides of the beam 78. Thus, as shown in FIG. 4, the chain 124 is attached to the left vertical plate 94 by means of an anchor 126. The chain is not attached to the right vertical plate 94. In the corresponding carriage 92 at the opposite end of the beam 78, the chain 124 is attached to an anchor 128 attached to the right vertical plate 94. Thus, as best shown in FIG. 5, when the motor 118 is driven in one direction, by virtue of the location of the anchors 126 and 128 on opposite sides of the carriages 92, the carriages are driven toward each other. When the motor is driven in the opposite direction, the carriges 92 are driven away from one another. Thus, the spacing between the carriages 92 on each of the beams 78 can be enlarged or contracted to accommodate material of various diameters.

Each of the legs 104 includes rests 130 for support of the coils 40. As shown in FIG. 2, the rests 130 may be tapered to help the rests 130 slip beneath the coils 40 when the legs 104 are pivoted to the vertical position.

As shown in FIGS. 2 and 4, each separator 96 extends vertically downwardly from the carriage 92. The separators 96 serve as limits for the carriages 92 so that the carriages 92 can be drawn toward each other only to the limit of the diameter of the coil 40 located between the separators 96. The separators 96, when drawn against a coil 40, also help stabilize the coil when it is raised and transported.

As shown in FIGS. 1 through 3, the transporting device 42 is situated to relocate the coils 40 from an upstream conveyor and place them on skids 44 located on the turntable 46. The coils enter the transporting device 42 on a conveyor section 132. Then, with the legs 104 separated a sufficient distance, either by pivoting of the legs 104, or by separating of the carriages 92, or a combination thereof, the cylinder 84 is activated and the beam 78 is lowered. The carriages 92 and legs 104 are appropriately adjusted so that the rests 130 are located beneath the coil 40. Then, the cylinder 84 is again activated to raise the coil 40 above the conveyor section 132 to the position shown in FIG. 2.

With the coil 40 firmly held in place, the actuator 62 is activated, rotating the turret 180°. The sequence is then reversed. The cylinder 84 is activated to lower the coil 40 onto the skid 44. The legs 104 are then pivoted and the cylinder 84 is reactivated to raise the beam 78 above the coil. The actuator 62 is then again activated to return the turret 180° to pick up the next coil 40 from the conveyor section 132. Of course, at the same time, while one coil 40 is being lifted from the conveyor section 132, another is being lowered onto a skid 44 on the turntable 46.

Normally, the coils 40 enter the transporting device 42 on the conveyor section 132 in a single file fashion. However, one or more of the coils 40 may be stacked on one of the skids 44. Accordingly, after a desired number of coils 40 are stacked on a skid 44, the turntable 46 is indexed a sufficient amount to locate another skid 44 in place for receiving of the coils 40. In the example shown in FIG. 1, indexing would normally be 90°, although, depending on several factors including the size of the turntable and the next desired location for the coil 40, indexing can be as much rotation of the turntable 46 as required. The number of coils 40 stacked upon a skid 44 is dictated only by the thickness of the coils and the limiting height of the lifting and stacking mechanism 54 when raised to its full extent within the rotatable turret 52.

A second embodiment of a transporting device 42' is shown in FIGS. 6 through 9. The transporting device 42' includes, as primary components, a stationary central support pedestal 150, a rotatable turret 152 situated at the top of the support pedestal 150, and a pair of arms 154 extending radially outwardly from the support pedestal 150.

The pedestal 150 has an integral base 156 which rests upon a factory floor or some other solid surface. Similar to the first embodiment of the invention, a rotary hydraulic actuator 158 is attached to the base 156 by any suitable means. A coupling 160 joins the output shaft of the actuator 158 to a plate 162 secured to the base of the rotatable turret 152.

A ring bearing 164 is situated between the plate 162 and an outer vertical wall 166 of the pedestal 150. As best shown in FIG. 9, the ring bearing 164 has an inner race 168 and an outer race 170. The inner race 168 is attached to the plate 162 by appropriate means, such as by a series of bolts 172 which also extend through the plate 162 into an annular base plate 174. The outer race 170 of the ring bearing 164 rests upon, and is attached to, an annular support 176 which is secured to the outer wall 166. In a manner similar to the inner race 168 the outer race 170 may be attached to the ring support 176 by means of a plurality of bolts 178.

The actuator 158 is the same as the actuator 62 of the first embodiment of the invention. Thus, the actuator 158 rotates the turret 152 180° in opposite directions. As in the first embodiment of the invention, other driving means can be substituted for the actuator in order to drive the turret 152 during the operation thereof.

The rotatable turret 152 is comprised of an upstanding metal cylinder 180 which sits upon, and is affixed to, the base plate 174. A metal cap 182 closes the upper end of the cylinder 180. A rectangular top plate is attached to the cap 182 by any suitable means, such as by a series of bolts 186 (FIG. 6).

As illustrated, the arms 154 extend radially outwardly from, and are attached to, the rotatable turret 152. Each of the arms 154 includes a carriage bracket 188, as best shown in FIGS. 6 and 9. Each carriage bracket 188 is slideable upon a pair of guide rods 190. The guide rods 190 extend between the top plate 184 and the base plate 174 and are suitably secured thereto, such as within bores in each of the plates 174 and 184. If desired, each of the rods 190, where protruding through the top plate 184, may include a seal or cap 192.

Each of the arms 154, as mounted upon its carriage bracket 188 and guided along the guide rods 190, is raised or lowered by means of a hydraulic cylinder 194. The body of each cylinder 194 is securely attached to the base plate 174. The rod 196 of each cylinder 194 extends upwardly therefrom and is threaded into the top of the carriage bracket 188. Upon actuation of either hydraulic cylinder 194, its associated arm 154 is therefore raised or lowered along the guide rods 190.

Depending on the length of the rods 190 and the type of loads to be carried by the transporting device 42', one or more intermediate support plates 198 can be employed, attached to the center of the cylinder 180. The plate 198 is recessed at 200 (FIG. 6) to allow passage of the rods of the hydraulic cylinders 194.

Each of the arms 154 is composed of a framework comprising longitudinal frame members 202 extending between an end plate 204 and a mounting plate 206 which is attached to the carriage bracket 188. A beam 208, at the base of the center of each of the arms 154, also extends between the end plate 204 and the mounting plate 206.

A pair of carriages 210 are mounted on the beam 208. As shown in greatest detail in FIG. 8, each of the carriages 210 is composed of a pair of vertical plates 212, the spacing of which is maintained by a rest 214 secured to the bottom thereof. Four rollers 218 extending between the plates 212 straddle the beam 208, two on top thereof and two beneath in order to facilitate movement of the carriages 210 along the beam 208.

In exactly the same manner as the first embodiment of the invention, the carriages 210 are interconnected and driven to and fro along the beams 208 by means of an endless chain 220. Each chain 220 passes over sprockets 222 and 224 attached to the end plate 204 and the mounting plate 206, respectively. One side of each chain 220 is attached at an anchor 226 to one of the carriages 210 while the other side of the chain 220 is attached at an anchor 228 to the other side of one of the carriages 210. Since the carriages are affixed to the chain 220 on opposite sides thereof, when the chain is rotated in one direction, the carriages 220 come together, while when the chain 220 is rotated in the opposite direction, the carriages 210 are spread. Driving of each 220 is by means of a drive motor 230 drivingly attached to the sprocket 224.

While the carriages 210 are situated to pick up a coil of metal 40 on the outer diameter thereof, the arm 154 also includes a pair of transverse carriages 232 situated on a transverse beam 234 for engaging the coil 40 on the inner diameter thereof. The carriages 232 are similar in form and function to the carriages 210. Each of the carriages 232 includes guide rollers 236 on opposite sides of the beam 234 to facilitate movement of the carriages 232 along the beam 234. An endless chain 238 passes over sprockets 240 attached for rotation at opposite ends of the beam 234 adjacent outermost frame members 202. One side of the chain 238 is attached to one side of one of the carriages 232, while the other side 238 is attached to the other side of the other of the carriages 232. A cylinder 244, having its body attached to the beam 208 and its rod 242 attached to one of the carriages 232, is used to spread or close the spacing between the carriages 232. Since the carriages 232 are interconnected by the endless chain 238, one cylinder 242 only is required to drive both carriages 232. Each of the carriages 232 includes a bottom rest 246 positioned to engage the coil 40.

Similar to the embodiment of FIGS. 1 through 5, the transporting device 42' is situated to relocate coils 40 from an upstream conveyor 132 and place them on skids 44 located on the turntable 46. The coils 44 enter the transporting device 42' on a conveyor section 132. When a coil is sufficiently far onto the conveyor section 132, the coil passes over an electric eye (not illustrated), which actuates a cylinder 248 to raise a centering device 250 to engage the inner diameter of the coil 40. The centering device 250 includes an up-standing peg 252 which engages the inner diameter of the coil 40. When so engaged, the conveyor section 132 is operated for a brief period of time to assure that the coil 40 is centered on the conveyor section 132.

With the coil thus in place, the left cylinder 194 is activated to lower the left arm 154 sufficiently so that the carriages 210 and 232 can be driven to engage the outer and inner diameters of the coil 40, respectively. With the coil 40 thus engaged, the cylinder 194 is again actuated to raise the coil 40 above the conveyor section 132. Then, the rotary actuator 158 is activated to rotate the turret 152 and arms 154 180°. The sequence of raising the coil 40 is then reversed. The cylinder 194 is activated to lower the coil 40 onto the skid 44. The carriages 210 are driven apart and the carriges 232 are driven together to release the coil 40. The cylinder 194 is then again activated to raise the arm 194 above the coil.

While the coil 40 is being released, another coil 40, which has been positioned on the conveyor section 132, is picked up. After the right coil 40 is released and the left coil 40 is picked up, the actuator 158 is then again activated to return the turret 180° to allow the same sequence to be repeated. Thus, so long as coils 40 are periodically entering the transporting device 42' on the conveyor section 132, the successive sequence of picking up coils 40 and depositing them on the turntable 46 is continuously repeated.

In the same manner as described in connection with the first embodiment of the invention, the turntable 46 is indexed a sufficient amount to locate another skid 44 in place for receiving coils 40 after a desired number of coils have been deposited on one of the skids 44. The number of coils 40 stacked upon a skid 44 is dictated only by the thickness of the coils and the height to which the arms 44 can be raised above the turntable 46.

Various changes may be made to the invention without departing from the spirit thereof or scope of the following claims.

What is claimed is:

1. A transportion device for relocating large, heavy material such as coils of steel from one position to a second position, said transporting device comprising;
   a. a stationary central support pedestal,
   b. a rotatable turret situated at the top of said pedestal, said turret including
      i. a central support shaft,
      ii. at least two arms each of which extends radially outwardly from said shaft and which is rotatably fixed relative to said shaft while permitting vertical movement relative thereto,
      iii. a material support for each arm, means to raise and lower each said arm to raise and lower said material support, and means to enlarge and contract said material support to accommodate material of varying horizontal dimensions, said material support and said arm being connected directly to said support shaft,
      iv. said material support comprising a guide extending substantially the length of said arm and a pair of carriages located on said guide, each carriage being laterally moveable along said guide from an end thereof toward the center thereof in a direction opposite to the other carriage to enlarge or contract the separation between the carriages, said carriages including rests for holding material to be relocated and abutting opposite sides of said material as it is relocated,
   c. bearing means between said pedestal and said turret to facilitate rotation of said turret, and
   d. driving means situated in said pedestal and attached to said turret to rotate said turret.

2. A transporting device according to claim 1 including a second pair of carriages located beneath said arm and each second carriage being movable in a direction opposite to the other second carriage, said second pair of carriages including rests for holding material to be relocated and being situated transverse to said first pair of carriages.

3. A transporting device according to claim 2 in which said means to enlarge and contract comprises
   a. a motor mounted on said arm and means drivingly attaching said motor to said first pair of carriages, and
   b. actuating means attached to said second pair of carriages.

4. A transporting device according to claim 3 in which said actuating means comprises a cylinder attached to said arm and one of said second pair of carriages and means interconnecting said second pair of carriages such that extension of said cylinder increases the spacing between said second pair of carriages and contraction of said cylinder decreases the spacing between said second pair of carriages.

5. A transporting device according to claim 1 in which said arms are mounted for raising and lowering to raise and lower said material support, and in which said means to raise and lower comprises a double-acting cylinder connected between each said arm and said turret.

6. A transporting device according to claim 5 including a guide for the raising and lowering of each said arm, each guide comprising a pair of vertical rods affixed to said turret and a bracket assembly upon which said arm is attached, said bracket assembly being mounted on said rods for vertical movement thereon.

* * * * *